US007274693B1

United States Patent
Kloth et al.

(10) Patent No.: US 7,274,693 B1
(45) Date of Patent: Sep. 25, 2007

(54) SEARCH ENGINE FOR FORWARDING TABLE CONTENT ADDRESSABLE MEMORY

(75) Inventors: Raymond J. Kloth, Mountain View, CA (US); Kevin D. Morishige, Los Altos, CA (US); Venkateshwar Rao Pullela, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 953 days.

(21) Appl. No.: 10/329,249

(22) Filed: Dec. 23, 2002

(51) Int. Cl.
*H04L 12/56* (2006.01)
(52) U.S. Cl. ........................... 370/389; 370/428
(58) Field of Classification Search ................ 370/392, 370/412, 428, 429; 711/117
See application file for complete search history.

(56) References Cited

U.S. PATENT DOCUMENTS

| 5,386,413 | A |   | 1/1995  | McAuley et al. ............ 370/54 |
| 5,938,736 | A |   | 8/1999  | Muller et al. ............... 709/243 |
| 6,137,707 | A | * | 10/2000 | Srinivasan et al. ........... 365/49 |
| 6,199,140 | B1 | * | 3/2001 | Srinivasan et al. ......... 711/108 |
| 6,356,551 | B1 |   | 3/2002 | Egbert ....................... 370/389 |
| 6,633,563 | B1 | * | 10/2003 | Lin et al. .................... 370/389 |

OTHER PUBLICATIONS

A longest prefix match search engine for multi-gigabit IPprocessing; Kobayashi, M. Murase, T. Kuriyama, A.; This paper appears in: Communications, 2000, ICC 2000. 2000 IEEE International Conference on Publication Date: 2000 vol. 3, On pp. 1360-1364 vol. 3 Meeting Date: Jun. 18, 2000-Jun. 22, 2000.*

An IP packet forwarding technique based on partitiioned lookup table; Akhbarizadeh, M.J. Nourani, M.; This paper appears in: Communications, 2002. ICC 2002. IEEE International Conference on Publication Date: 2002 vol. 4, On pp. 2263-2267 vol. 4.*
IP lookups using multiway and multicolumn search; Lampson et. al.; IEEE/ATM Transactions on Networking (TON) archive vol. 7, Issue 3 (Jun. 1999) pp. 324-334 Year of Publication: 1999. □□*

* cited by examiner

*Primary Examiner*—Hassan Kizou
*Assistant Examiner*—Salman Ahmed
(74) *Attorney, Agent, or Firm*—Thelen Reid Brown Raysman & Steiner LLP (57) ABSTRACT

A hardware search engine facility is provided to allow CPU search and update of a Forwarding Table CAM under the control of software running on the CPU. The hardware search engine provides one or more comparand-mask pairs which allow for a match, exclusion or magnitude comparison on specific entry values and/or the option to ignore or "don't care" certain bits of the entry. Control registers may be set in software to specify a start address and stop address in the CAM for the search. An indication of valid or invalid entries may be provided as well. Once the search is initiated by software, the search engine will read the entries sequentially starting from the programmed start address. It will perform a compare using the comparand-mask pair and attempt to identify a match. The locations in the CAM which match the search criteria may be put into a CPU-accessible memory. If the memory fills up before it can be read by the software, the search may be halted until the memory is emptied. A programmable action may instead, or in addition, be set to take place in the event of a match. Such programmable actions may include, but are not limited to, marking the entry, deleting the entry, change status bits corresponding to the entry, rewriting some of the entry, and the like.

21 Claims, 4 Drawing Sheets

SEARCH ENGINE FOR FORWARDING TABLE CONTENT ADDRESSABLE MEMORY

CROSS-REFERENCE TO RELATED APPLICATION

This application claims priority based on parent application Ser. No. 09/287,301, filed on Apr. 7, 1999 now U.S. Pat. No. 6,570,877, in the name of inventors Raymond Kloth, Kevin Morishige and Venkateshwar Pullela, entitled "SEARCH ENGINE FOR FORWARDING TABLE CONTENT ADDRESSABLE MEMORY".

BACKGROUND OF THE INVENTION

1. Field of the Invention

The present invention relates to the field of data communications networks. More particularly, the present invention relates to a method and apparatus for implementing a facility within a component of a data communications network that tracks packet flows with a content addressable memory (CAM) for managing and processing the contents of that CAM.

2. The Background

In switched packet data communications systems, packets are received, modified and transmitted by network node devices known as routers, switches and switching routers. Regardless of the nomenclature, such network node devices typically utilize forwarding engines to maintain flow information relating to each related stream of packets. Flow information for a particular packet flow should be maintained in a local memory at the network node while the packet flow is extant on the network. Flow information should be purged from the memory when the packet flow has stopped so that the memory does not become full. For example, if a user on a computer network is contacting a particular web server on the Internet, the communications from that web server to the user constitute a particular "flow". When the user switches to another web server, those communications constitute a different "flow". The information stored by the Forwarding Engine may be used to reconfigure or rewrite a packet so that it is forwarded to the next node in its journey through the data communications network. It may also be used to provide statistical or accounting data, it may also be used for bridging and learning as well as a plethora of other applications. Once the user disconnects from the first web server, that flow is no longer useful and packets will stop coming through the network node device which match that flow. It is that flow information which should be purged eventually.

With the growth in the use of networks such as LANs, (local area networks), WANs (wide area networks), the Internet and corporate intranets, the processing rates of packets through nodes on the networks have increased drastically and need to increase even more in order to meet future anticipated demand for communications speed and volume. Furthermore, the diversity of different flows has increased so that there are drastically more flows to keep track of than there were in the past. Furthermore, flows appear and terminate much more quickly than in the past due to the variety of services available on such networks. Finally, it is becoming more important to be able to gather statistical and accounting information relating to the various flows for network maintenance, design and accounting purposes.

One solution is to keep track of these flows in large tables of Random Access Memory (RAM) or Static RAM (SRAM). Such tables can store forwarding information for packet flows based upon the packet's Layer 2 and/or Layer 3 information. They can also store statistical information relating to such flows and permit it to be updated frequently. When such a solution is used, the "learning" function, whereby portions of new flows are written into the memory, is typically performed by packet processing hardware. This is because of the inherent speed advantage that hardware has over CPU (central processing unit)-processed software solutions. In the learning function the table stored in memory is modified to add information taken from newly detected packet flows. Because the table can be large (having hundreds of thousands of entries or more) and the flow entries may contain hundreds of bits of information, it is desirable to hash the entries based upon a reduced number of the flow bits and therefore scatter the entries pseudo-randomly throughout the table.

Once a Forwarding Table is established, however, it is important to be able to manage it. Even a table with millions of possible entries will eventually become full if no mechanism exists to purge entries every once in awhile. Traditionally, such routines have been executed in software by a CPU associated with the network node device.

A CPU has a limited number of instruction cycles that it may accomplish in a given amount of time. Some of the time the CPU is free to access the Forwarding Table, some of the time it is not free to access the Forwarding Table. Given the speed at which modern network node devices operate, it is simply impractical for a software routine under the control of a CPU to serially access each entry in a Forwarding Table and then act on it. Accordingly, a need exists for a mechanism whereby a large, table of packet forwarding information may be managed quickly by a CPU without causing a significant impact on system throughput or responsiveness.

SUMMARY OF THE INVENTION

A hardware search engine facility is provided to allow CPU search and update of a Forwarding Table CAM under the control of software running on the CPU. The hardware search engine provides one or more comparand-mask pairs which allow for a match, exclusion or magnitude comparison on specific entry values and/or the option to ignore or "don't care" certain bits of the entry. Control registers may be set in software to specify a start address and stop address in the CAM for the search. An indication of valid or invalid entries may be provided as well. Once the search is initiated by software, the search engine will read the entries sequentially starting from the programmed start address. It will perform a compare using the comparand-mask pair and attempt to identify a match. The locations in the CAM which match the search criteria may be put into a CPU-accessible memory. If the memory fills up before it can be read by the software, the search may be halted until the memory is emptied. A programmable action may instead, or in addition, be set to take place in the event of a match. Such programmable actions may include, but are not limited to, marking the entry, deleting the entry, change status bits corresponding to the entry, rewriting some of the entry, and the like.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after a perusal of this disclosure.

In accordance with a presently preferred embodiment of the present invention, some of the components, process steps, and/or data structures are implemented using ASIC (application specific integrated circuit) technology. This implementation is not intended to be limiting in any way. Different implementations may be used and may include various types of operating systems, computing platforms, and/or computer programs. In addition, those of ordinary skill in the art will readily recognize that devices of a more general purpose nature, such as hardwired devices, devices relying on FPGA (field programmable gate array) technology, and the like, may also be used without departing from the scope and spirit of the inventive concepts disclosed herewith.

System Overview

Figure 1:
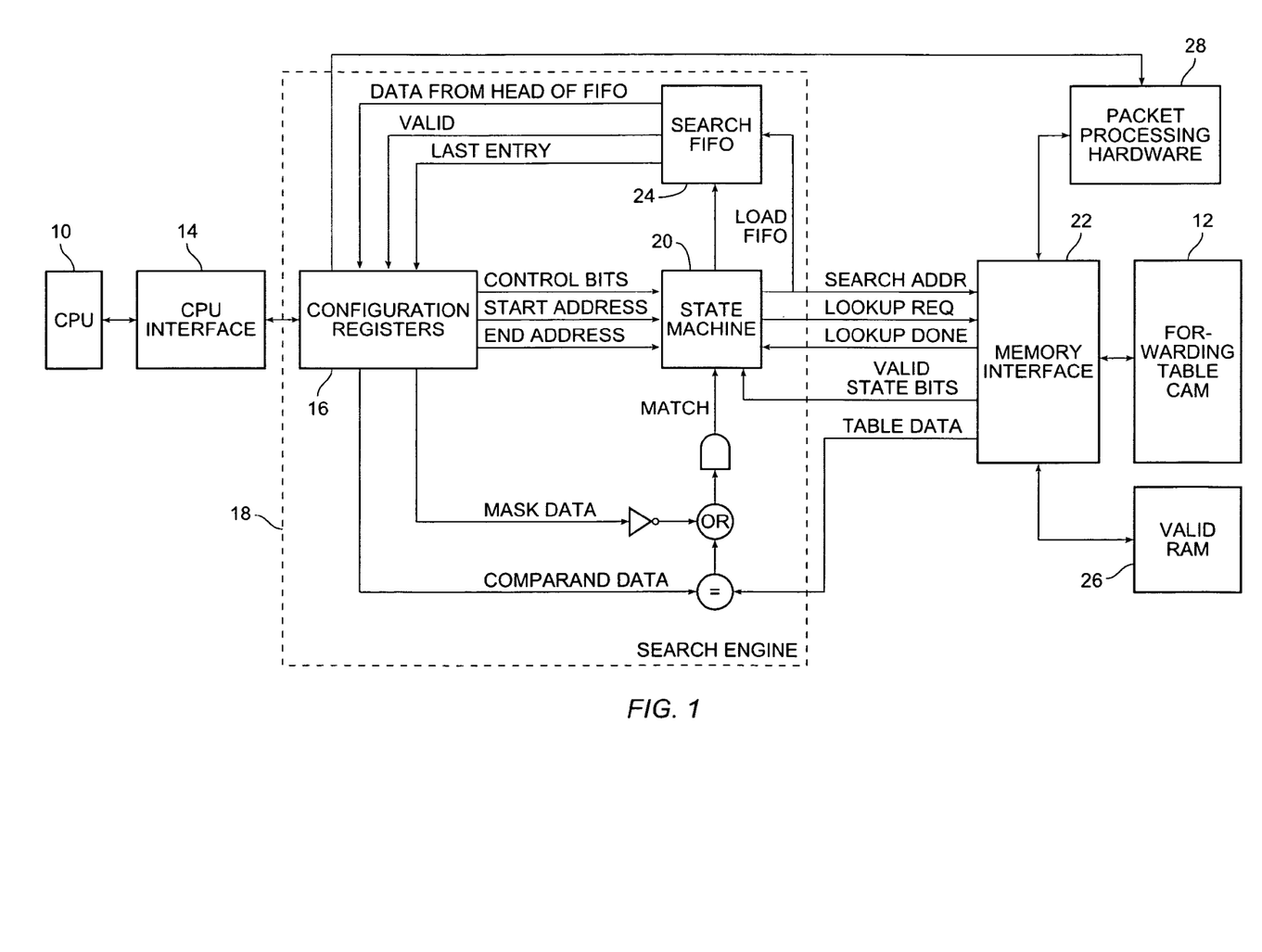
FIG. 1 is a system block diagram of a presently preferred embodiment of the present invention.

Turning now to FIG. 1, a system block diagram of a presently preferred embodiment of the present invention is shown. When a CPU (central processing unit) 10 of the network node device desires to conduct an operation involving the contents of the Forwarding Table CAM 12, it uses conventional CPU interface 14 to write instructions to configuration registers 16 of search engine 18. The instructions are used to configure a state machine 20 with information regarding the scope and nature of the search and to program one or more mask data/comparand data pairs to define the search. The state machine 20 accesses the Forwarding Table CAM 12 via a memory interface 22 and optionally loads the resulting data into search FIFO 24 where it is passed back to CPU 10 via configuration registers 16 and CPU interface 14 in a conventional manner. In one embodiment discussed in more detail below, if only "valid" entries are specified to be searched, a separate Valid RAM (VRAM) 26 is checked as well so that only "valid" entries specified in the VRAM 26 are looked at in the Forwarding Table CAM 12. It is also possible to incorporate the VRAM 26 into bits of the Forwarding Table CAM 12.

The system is particularly useful for implementing aging algorithms on the data in the Forwarding Table CAM so that old data is purged to make room for new data before the Forwarding Table CAM is filled. It is also particularly useful for collecting statistics and accounting information from entries in the Forwarding Table CAM. Other operations can also be conducted on the Forwarding Table CAM Data by the CPU as will be discussed in detail below.

Forwarding Table CAM

Figure 6A:
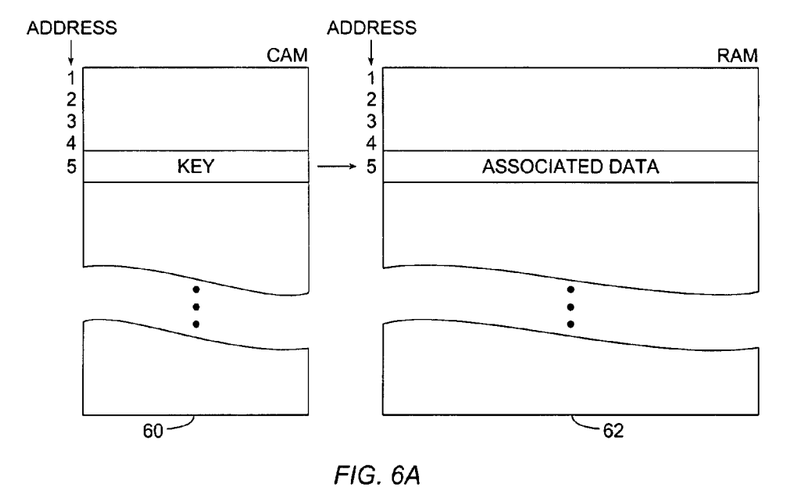
FIG. 6A is a block diagram of a Forwarding Table CAM and associated data RAM in accordance with one embodiment of the present invention.

The Forwarding Table CAM 12 may be implemented in a number of ways in accordance with the present invention. FIG. 6A shows one way. In FIG. 6A, a "true" CAM 60 and an Associated Data RAM 62 store the Forwarding Table information. The "Key" portion of the information relating to a particular entry is stored in the CAM and is searchable by the CAM based upon the key itself. For example, a particular flow has a unique key associated with it. The CAM receives this key and outputs an address of the entry in the CAM. This address is then used to look up the Associated Data associated with that unique entry in the Associated Data RAM 62. It is possible to read and/or change the key in the CAM and/or the Associated Data.

Figure 6B:
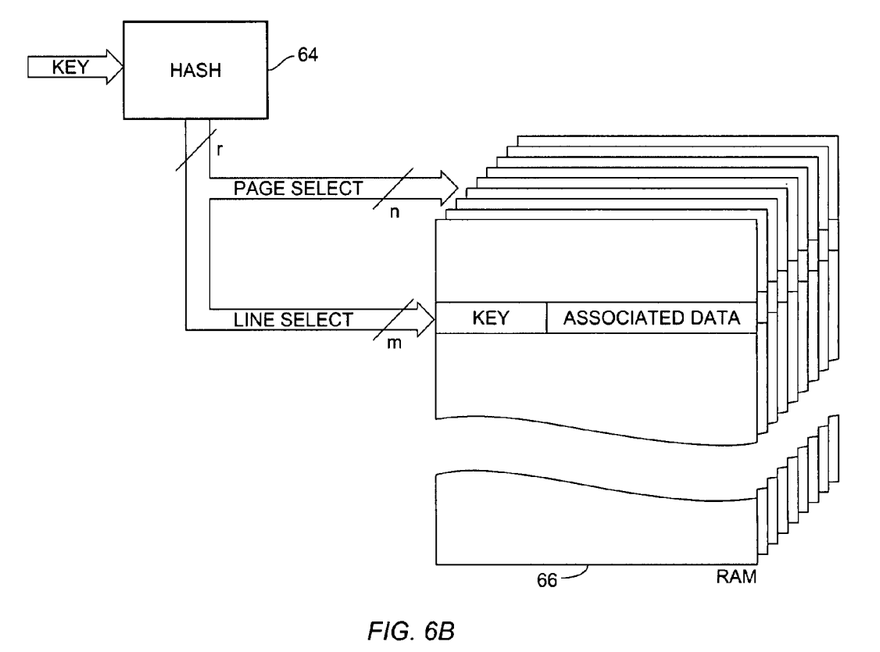
FIG. 6B is a block diagram of a Forwarding Table using a hash table in accordance with an alternative preferred embodiment of the present invention.

In FIG. 6B a different implementation of the Forwarding Table 12 is shown. Here the "Key" derived from the flow is input to a hash functional block 64. The hash functional block 64 takes the key which may have 100 bits or more of data and pseudo randomly (but repeatably) converts or maps it into an r-bit hash value. The r-bit hash value includes an n-bit page select value and an m-bit line select value where r=m & n. The page select value is used to select an initial target page. The line select value selects a line with which are associated an entry on each page. Together, the line select and page select value select a particular unique entry within RAM 66. Each entry includes the key and associated data. It is possible to read and/or change the key and/or associated data in the RAM 66.

While there may be physical differences in these implementations of Forwarding Table CAM 12, they are logically equivalent.

Figure 2:
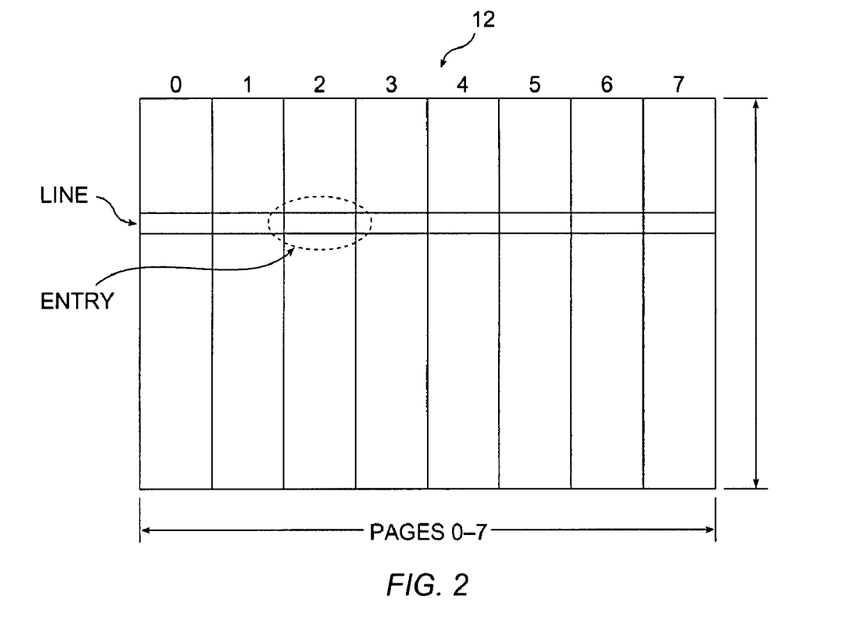
FIG. 2 is a diagram showing the organizing of a Forwarding Table CAM in accordance with a presently preferred embodiment of the present invention.

A diagram of the Forwarding Table CAM 12 in accordance with one embodiment of the present invention is provided at FIG. 2. In one embodiment of the invention, Forwarding Table CAM 12 may include SRAM memory (or other suitably fast memory), resulting in 8 pages of associated memory each capable of holding thousands of entries. The capacity may be increased to any desired level. Those of skill in the art will realize that other memory configurations may be used as desired for a particular application. CAMs include content addressability, but it is normally limited to the "key" field only, and does not permit searching the associated data. The addressability is limited to a mask and match and can return only a single result (address). This is insufficient for the applications described herein, hence the desirability of a sophisticated search engine to probe and search the contents of the CAM based upon a number of different criteria.

The Forwarding Table CAM 12 is normally accessed by using a "key" that is a masked subset of the flow information contained in the entries of the Forwarding Table CAM 12. Because the entries in the Forwarding Table CAM 12 and even the "key" portion thereof may include more than 100 bits of information, it simply isn't practical to do direct addressing into a memory based upon the entry or the key as it would require a memory having $2^{100}$ or more entries. To avoid this difficulty, a hash is used. The key is hashed in a conventional manner to provide a multi-bit pointer into a smaller table. While an advantage of the smaller table is its much smaller cost, a disadvantage is the possibility that more than one flow's key may map to the same location in the smaller table.

The Forwarding Table CAM 12 in accordance with one embodiment of the present invention has three elements to it: entries, lines and pages. Each line contains a plurality of entries, one associated with each page. A line number coupled with a page number uniquely define a particular entry. The CAM shown in FIG. 6B illustrates an embodiment having 8 pages.

In one presently preferred embodiment there is a valid-bit associated with each entry and stored in a separate VRAM or Valid RAM 26 (FIG. 1). This is discussed in more detail below. Each "valid" entry in the CAM stores all the information about a particular flow including the complete key. Some of the LSB (least significant bits) bits of the multi-bit hash value are used to select a line in the CAM. Some of the MSB (most significant bits) bits of the hash value are used to select a starting page. The exact configuration of the memory is one of design choice based upon the specific application.

The VRAM is read for each of the pages associated with a particular line value at the same time. In this way the system can immediately determine if there is a conflict over the target memory location (entry) specified by page and line number. If there is no conflict (i.e., the target location is empty), then it is allocated and written to. If there is a conflict, (i.e., it is being used), then the system tries to identify another page with the same line number that is available. If one is available, it is used and the VRAM 26 updated. If none are available, then one may be freed for one or another appropriate action taken. Where there is a potential conflict, it becomes clear from reviewing the VRAM entry. In such a case, each page location for the line needs to be checked to see if it is the correct one when doing a read. Note that the table should be maintained so that it is sparsely populated so as to minimize the number of potential conflicts and decrease delay due to this sort of checking.

Figure 5:
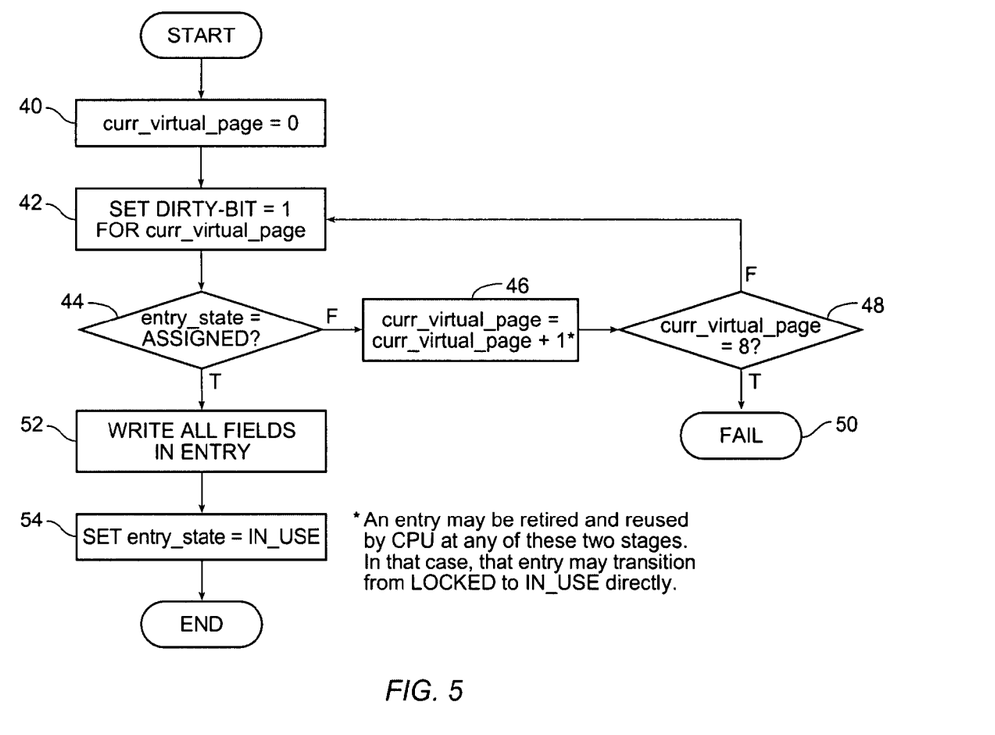
FIG. 5 is a flow diagram showing the process for new entry insertion in the Forwarding Table CAM by the packet processing system.

Turning now to FIG. 5, the process used by the packet processing system for selecting a different page where an address directs it to a page and line of the Forwarding Table CAM 12 which is occupied as shown. The current virtual page is set to 0 (40) for the initial table address, regardless of the actual page number, thus if the address is page 3, line 1024, the virtual page number will be 0. At 42 the "dirty" bit is set for the entry at the current virtual page. At 44 the entry is checked to see if it is in the ASSIGNED state (dirty=1, valid=0). If it is, then the fields of data are written to the entry in the CAM (52), the state is updated to IN_USE (54) and the process is complete. If, however, the state is not ASSIGNED (e.g., it is LOCKED), the at 46 the current virtual page is incremented to the next page—i.e., it is incremented by one but referring to the next in sequence, thus 3 becomes 4, 7 becomes 0—and at 48, as long as the current virtual page is not 8 (an overflow condition) control goes back to block 42 to continue the search for an empty entry. Otherwise, a failure condition exists (50). Note that at either block 46 or block 50 it is possible to simply force the retirement by directly changing the state of the entry from LOCKED to IN_USE.

In one embodiment of the invention, the CAM is organized as described below. Those of ordinary skill in the art will realize that the specific data included in the CAM, and its order, is not critical to this invention and represents a design choice based upon the goals of the designer.

The basic fields of the CAM entries include:
1. Key fields for valid entries matched to packet information;
2. Control fields (used, e.g., for shortcut decision control, marking entries for action, etc;
3. Rewrite fields used for packet edits;
4. Statistical fields used for tracking usage and service;
5. Miscellaneous fields.

The key fields differ based upon protocol. For instance, IP, IPX, and L2-flow key fields are different. The rewrite fields differ between IP-multicast, IPX/IP-unicast and L2-flow. An L2-flow is created for statistics and accounting purposes only.

The key fields include such information as IP source and destination address information, protocol type, Layer 4 port numbers, MAC (media access control) source and destination addresses and virtual LAN (VLAN) information. The control fields include various tags, flags and settings. The rewrite fields include, among other things, hardware address information which is rewritten between hops. The statistics fields include various flags, counts and time stamps used for packet processing. The time index that the entry was made at is stored and the last-seen time index is kept as a way to tell when the particular flow last appeared at the network node device. These are used in aging operations as discussed below.

Valid RAM In order to quickly determine which entries in the Forwarding Table CAM 12 are fully valid and/or are available for use, in accordance with one presently preferred embodiment of the present invention, a pair of state bits is maintained in a Valid RAM (VRAM) 26 for each entry location in the CAM. A first bit, known as the "dirty" bit, is used to indicate that the corresponding entry location may be used for packet processing only if it is reset, i.e., "0". This bit may be set by the CPU 10 or by the search engine 18 to exclude an entry from packet processing use. It is normally reset by the CPU 10 when it wants to free an entry for use again. A second bit, known as the "valid" bit, indicates that the key field of the corresponding CAM entry is valid if the bit is set. The bit may be set when a new entry is created and is normally reset by CPU 10 when the entry is to be freed for reuse.

Figure 3:
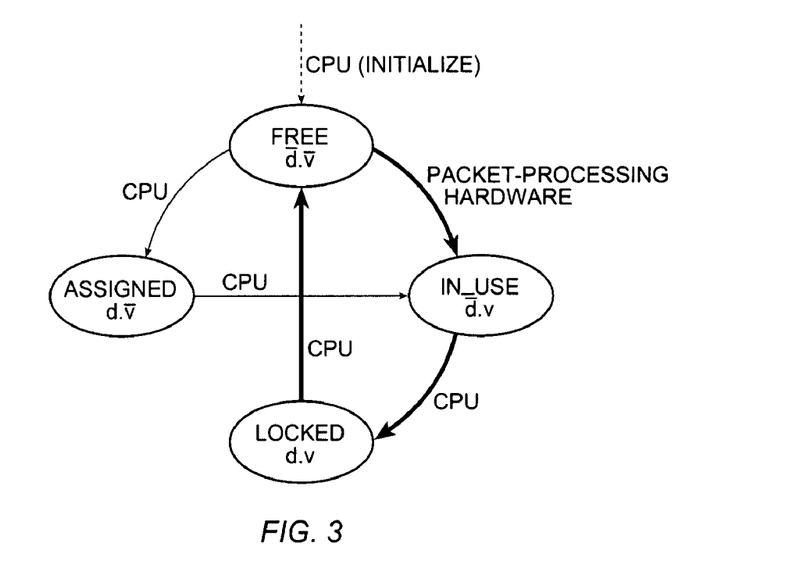
FIG. 3 is a flow diagram showing the order of change of the state bits in Valid RAM in accordance with a presently preferred embodiment of the present invention.

FIG. 3 is a flow diagram showing the order of change of the state bits in VRAM in accordance with a presently preferred embodiment of the present invention.

The state bits stored in the VRAM 26 allow the search engine 18, the CPU 10 and the packet processing hardware 28 to access the Forwarding Table CAM 12 in an orderly fashion. The two bits for each entry define four states. Table 1 shows what each state means.

TABLE 1

| dirty | valid | state | meaning |
|---|---|---|---|
| 0 | 0 | FREE | The entry is unused and available. |
| 0 | 1 | IN_USE | The entry is in use for frame processing. |
| 1 | 0 | ASSIGNED | The entry is reserved by the CPU to be placed IN-USE in the future. |
| 1 | 1 | LOCKED | The entry is retired from being IN-USE and waiting for the CPU to set it FREE. |

The CPU 10 or search engine 18 initializes all entries to the FREE state. The packet processing hardware 28 uses FREE entries to create a new entry and at the same time changes the state of that entry to IN_USE. Entries that are IN_USE may be used by the packet processing hardware to learn shortcuts and store statistical and accounting information for later use, e.g., by the CPU.

When the CPU wants to access a FREE an IN_USE entry, it must first set the dirty bit. In case the transition is from IN_USE to LOCKED, the CPU must wait before reading the statistics fields of the entry. This delay matches the delay between the time when the packet processing hardware 28 reads the state-bits and the time when it updates the statistics fields. This is so that the statistics fields may be read and stored elsewhere before being lost with the purging of the entry.

A "FREE" entry is available to be placed "IN_USE" by the packet processing hardware 28 or placed in the "ASSIGNED" state by the CPU 10. The CPU 10 should not directly read or write entries that are "IN_USE". An "IN-USE" entry is being used for frame processing. The CPU 10 or search engine 18 may retire this entry to the "LOCKED" state from which it will eventually be freed. An "ASSIGNED" entry is reserved by the CPU 10 to be placed "IN_USE" or "FREE" in the future. The packet processing hardware 28 does not read or write "ASSIGNED" entries. The "LOCKED" state indicate that the entry has been retired from the "IN-USE" state and that it is waiting for the CPU 10 to collect its statistics information and set it "FREE" for reuse. The packet processing hardware 28 does not normally read or write "LOCKED" entries.

New entries in the Forwarding Table CAM 12 may be created either by CPU 10 or by the packet processing hardware 28. Entries in the Forwarding Table CAM 12 may be examined and a number of actions may ensue. The CPU may cause the entries to be marked or changed in some way as, for example, would be the case if the CPU decided to change the addressing on some of the flows. It might also simply delete all entries meeting a certain collection of search criteria, e.g., all entries more than 60 minutes old. It might also request the hash addresses or keys of certain entries meeting a certain collection of search criteria for further processing.

An interesting case arises when both the CPU 10 sets the dirty-bit and the packet processing hardware 28 sets the valid-bit for the same FREE entry. In that case, the entry ends up in the LOCKED state and it becomes equivalent to the CPU 10 retiring the entry as soon as it was created.

So, after the CPU 10 tries to make a transition from FREE to ASSIGNED, it must read the VRAM 26 and verify that the entry is actually in the ASSIGNED state. If it finds the entry in the LOCKED state, it may collect the statistics and set the entry FREE immediately. Alternatively, it may leave the entry in the LOCKED state for later collection. In that case there needs to be a mechanism by which these entries are reclaimed, otherwise there will be a slow loss of available CAM memory.

The most common state transitions are marked with thick arrows in FIG. 3.

Figure 4:
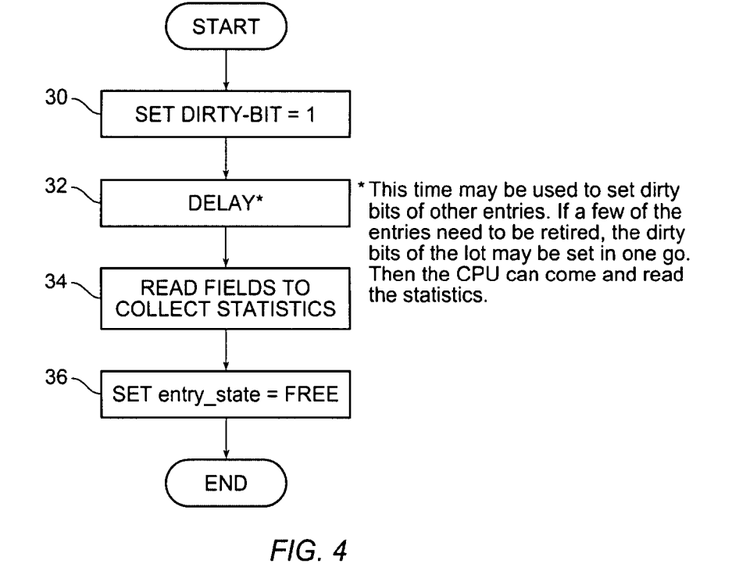
FIG. 4 is a flow diagram showing the process for releasing an entry in the Forwarding Table CAM for reuse.

It is usually important to avoid losing statistics on any flows. If the CPU 10 simply chose an entry that was FREE when it read the VRAM 26 and marked it directly as IN_USE in the VRAM status bits it might conceivably overwrite a packet processing hardware-entered flow that was created after the CPU read the VRAM but before the CPU could write back to the VRAM. Statistics data would then be lost if the packet processing hardware write to the CAM occurred in the same period as the CPU write. Since the statistics information can be used for accounting purposes, it is important to keep it as intact as possible. Generally, as shown in FIG. 4, the purging of valid entries to be retired is done by first setting the dirty bit (30), waiting or delaying (32) until the system is able to read the statistics fields and collect necessary data from the entry (34), and when this is accomplished, resetting the dirty and valid bits to mark the entry as FREE (36).

One problem that can occur in this type of implementation is that the CPU 10 may decide to read an entry. To do this, it must lock it so that the value read will be stable. In the meantime, however, additional information may come along which would normally go to that entry, e.g., statistics and accounting information like packet and/or byte counts. one mode of handling this is to terminate the LOCKED entry and start a new entry. The problem with this solution is that both the LOCKED entry and the new entry will have the same hash and hence will conflict for use of the optimal entry in the Forwarding Table CAM. This may reduce system performance slightly until the LOCKED entry is purged and the new entry migrates over to its "correct" location (by a periodic purge), however, this solution provides accurate statistics information which is often desired. Another mode of handling this situation is to treat the entry as unavailable or LOCKED and bridge the entry to another device allowing the statistic information to be handled by another device. This can be difficult to coordinate and can use system overhead. A third mode of handling this situation is to simply let the statistics during the LOCKED state be ignored. This results in the fastest processing but can yield slight undercounts in the statistics and accounting area. The mode used can be set by control bits in a conventional manner so that the customer may select the mode most appropriate to its circumstances.

CPU Interface

The CPU Interface 14 comprises conventional configuration registers that can be read by and written by the CPU 10 as well as read by and written by the search engine 18. This permits information to be passed asynchronously between the CPU 10 and the search engine 18.

Search Engine Operation

The Search Engine 18 provides the facility for enabling the CPU 10 to examine portions of the contents of the Forwarding Table CAM 12 and match on specified field patterns in an autonomous fashion. The CPU 10 specifies a start location and an end location for sequential searching as well as the portions of the Forwarding Table CAM 12 entries that it wishes to match on. As results from the search are available, the CPU 10 may read from a memory (in one embodiment a multi-entry FIFO (first-in, first-out) memory) the addresses of the entries in the Forwarding Table CAM 12 which meet the search criteria.

The Search Engine 18 interacts with the CPU Interface 14 (and via it with the CPU 10), the VRAM 26 and the Forwarding Table Interface 22 (and via it with the Forwarding Table CAM 12).

The CPU Interface 14 provides the mechanism for setting up the comparand, mask, time stamp value or threshold, address range and control registers of the Configuration Registers 16 as well as reading back the results from the Search FIFO 24.

The VRAM 26 "valid" bit is accessed if the VLD_ONLY bit has been set in the SE-CNTRL register. The VLD_ONLY bit indicates that only the entries in the Forwarding Table CAM 12 which are designated as "valid" in the VRAM 26 should be examined during the search. Valid bits are fetched from VRAM 26 on a per-line basis before the particular corresponding line of the forwarding Table CAM 12 is accessed.

Operation of the Search Engine 18 for normal searches is as follows:

1. Initialize the comparand register(s) to the desired match values The Search Engine comparand register is referred to as SE_.

2. Initialize the mask registers to the desired configuration. Setting "1" on any bit location indicates in one embodiment that a match must occur on that bit of the entry. The Search Engine mask register is paired with a corresponding comparand register and is designated SE_MASK. Time stamp registers may be used instead or as well to search for entries based on temporal characteristics as discussed in more detail below.

3. Initialize the start address and start page (SE_START) and end address and end page (SE_END) of the forwarding table CAM to specify the scope of the search. In one embodiment end addresses smaller than start addresses are allowed and cause the last entry in the Forwarding Table CAM 12 to wrap back to the first entry. Pages are accessed in increasing numerical order. It is also possible to configure the Search Engine to loop continuously until stopped. Thus it would be possible to specify a criterion and search and act on that criterion in a loop. For instance, the Search Engine could be programmed to continuously loop looking for 60 minute old entries or greater than or equal to 60 minute old entries and purge them or mark them LOCKED, or the like.

4. Enable the search by setting the ENABLE bit of the SE_CNTRL register to "1". The searching of valid or invalid entries is controlled by the VLD_ONLY bit of the same register.

During the search, the CPU 10 may track the status of the search by examining the DONE field and FF_DEPTH (FIFO depth) field of the SE_STAT (search status) register. The search may be halted at any time be clearing the ENABLE bit of the SE_CNTRL (search control) register and later resumed from the start point once that bit is set again to "1".

The speed of the Search Engine 18 can be controlled in a number of ways. Since access to the Forwarding Table CAM 12 is shared in a time-multiplexed manner with the packet processing hardware 28, the amount of time that the search engine 18 can use the Forwarding Table CAM 12 may be adjusted up or down as a percentage of the total available. The speed of the search engine 18 may also be controlled directly, as by reducing the speed or throttling back where the search FIFO 24 is becoming too full and is in danger of reaching an overflow condition. Depending upon the implementation, it may be undesirable or merely inconvenient to reach an overflow condition on the search FIFO. For example, in one embodiment, where searches are pipelined, the Search Engine 18 will access the table at half-speed if only one empty FIFO entry is left. This allows the Search Engine 18 to identify whether or not there has been a "hit" on an entry and the Search FIFO 24 is therefore becoming full before launching the next table access. Alternatively, if the Search FIFO 24 becomes filled during the search operation, the Search Engine 18 may simply pause at the current entry and wait until an empty slot in the Search FIFO 24 becomes available.

At the completion of the search, or once valid entries are available, they may be read from the Search FIFO 24 via the SE-DAT (search data) register.

A "next MAC" search is performed to find the next in sequence MAC (media access control) hardware address number in the Forwarding Table CAM 12. This can be useful for customers attempting to verify the structure of their network or simply administer their network. This can also be done for IP addresses.

Operation of the Search Engine 18 for next MAC searches is as follows:

1. Initialize the comparand register(s) to the desired match values. The MAC address field will be used as the base value for determining the next sequential address. A magnitude compare will be used to identify "larger" MAC addresses.

2. Initialize the mask registers. Setting "1" on any bit location indicates that a match must occur on that bit entry except for the bits which correspond to the MAC address field. MAC address field MAC bits are ignored in this search mode.

3. Initialize the start address and start page and end address and end page. End addresses smaller than start addresses are allowed and will cause the search to go to the last entry of the Forwarding Table CAM 12 and wrap back to the first entry. Pages are accessed in increasing numerical order.

4. Enable the search by setting the ENABLE bit as before. There must be at least one empty entry in the Search FIFO 24. The Search Engine 18 will use one spot of the Search FIFO 24 to store intermediate result values since the search is iterative. If the FIFO is full, the search is invalid.

5. During the search the CPU 10 may track the status of the search by examining the DONE field in the SE_STAT register. The FIFO depth will not change nor will any valid entries appear in the FIFO until the search is completed. The search may be halted at any time as before.

6. At the completion of the search one valid entry will appear in the FIFO and may be read out from the SE_DAT register.

Note that when a match condition is found using whatever criteria for the search, the address of the CAM entry may be put into the search FIFO, the state bits in the VRAM 26 modified for that entry, an action taken directly to the entry by the search engine, or any combination of these possibilities. Bits of the control registers set by the CPU 10 control the action to be taken.

When the SE_END address is reached, the search operation stops completely. This resets the SE_ENABLE bit and causes generation of the SE_DONE (search engine is done) interrupt to advise the CPU 10 that the search has been completed. The SE_DONE bit is also set in the SE_STAT register.

The search FIFO 24 may also be monitored for fullness by setting a high water mark and monitoring an interrupt indicating that the high water mark has been reached.

Aging

The processing of entry aging is an important aspect of the present invention. The CAM entries include a "first seen" time stamp and a "last seen" time stamp which is updated when new packets match existing flows stored in the Forwarding Table CAM 12. It is possible to use the CPU 10 to purge the Forwarding Table CAM 12 of "older" entries, both on a regular basis (say, for example, the entry will be deleted if the "last seen" is ten minutes old or older) or on a demand basis (say, for example, the CAM is relatively full, a purge can be conducted on a number of criteria such as protocol type, time since last seen, or any convenient criteria based upon the contents of the flow stored in the CAM). Thus, for example, flows matching criteria indicative of non-recurrence may be selectively purged. Furthermore, it is often desirable to purge entries whose total age since first seen exceeds a certain value, regardless of whether it is still being used. This circumstance comes up in accounting issues where, for example, it is desirable to sweep all account activity every 30 minutes or so to insure that a system outage won't result in the loss of significant amounts of accounting data.

Note that it may be desirable to aggressively age entries from the Forwarding Table CAM under certain circumstances. These may include situations where: hash line entries have many VALID and/or LOCKED entries meaning that many pages are unavailable, the Layer-2 addressing information is known or suspected to be incorrect due to a network reconfiguration, single event flows such as DNS (domain name system) queries exist in the table, TCP-IP flags indicating the end of the flow have been received for a particular flow, and the like.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for utilizing a search engine to examine entries within a forwarding table, the method comprising:
    acquiring a first comparison criterion, the first comparison criterion including a mask indicating which bits of the entries are to be considered, a comparand value to be compared to the bits to be considered, and a comparison type to be used in comparing the entries with the first comparison criterion;
    acquiring at least one action associated with the first comparison criterion to be taken upon a positive comparison result;
    acquiring a second comparison criterion, the second comparison criterion including a mask indicating which bits of the entries are to be considered, a comparand value to be compared to the bits to be considered, and a comparison type to be used in comparing the entries with the second comparison criterion;
    acquiring at least one action associated with the second comparison criterion to be taken upon a positive comparison result;
    conducting a single comparison in accordance with the first comparison criterion and the second comparison criterion to at least one entry within the forwarding table;
    taking the at least one action associated with the first comparison criterion in response to a positive comparison result with respect to the first comparison criterion;
    taking the at least one action associated with the second comparison criterion in response to a positive comparison result with respect to the second comparison criterion; and
    reporting comparison matches for either or both of the first and second comparison criterion by writing the addresses of the matched entries to a memory.

2. The method as defined in claim 1, further comprising pausing the comparison while the memory is beyond a specified state of fullness until the memory is emptied below the specified state of fullness.

3. The method as defined in claim 1, further comprising checking, before conducting each comparison, whether the entry is valid and skipping the comparison with respect to that entry when the entry is not valid.

4. The method as defined in claim 1, wherein the at least one action associated with either or both of the first and second comparison criterion includes modifying the entry in the forwarding table.

5. The method as defined in claim 1, wherein the at least one action associated with either or both of the first and second comparison criterion includes marking the entry in the forwarding table.

6. The method as defined in claim 1, wherein the at least one action associated with either or both of the first and second comparison criterion includes setting at least one bit in a memory and the at least one bit corresponds to the entry in the forwarding table.

7. A method for utilizing a search engine to examine entries within a forwarding table, the method comprising:
    acquiring a first comparison criterion, the first comparison criterion including a mask indicating which bits of the entries are to be considered, a comparand value to be compared to the bits to be considered, and a comparison type to be used in comparing the entries with the first comparison criterion;
    acquiring at least one action associated with the first comparison criterion to be taken upon a positive comparison result;
    acquiring a second comparison criterion, the second comparison criterion including a mask indicating which bits of the entries are to be considered, a comparand value to be compared to the bits to be considered, and a comparison type to be used in comparing the entries with the second comparison criterion;
    acquiring at least one action associated with the second comparison criterion to be taken upon a positive comparison result;
    conducting a single comparison in accordance with the first comparison criterion and the second comparison criterion to at least one entry within the forwarding table;
    taking the at least one action associated with the first comparison criterion in response to a positive comparison result with respect to the first comparison criterion; and
    taking the at least one action associated with the second comparison criterion in response to a positive comparison result with respect to the second comparison criterion, wherein the at least one action associated with either or both of the first and second comparison criterion includes deleting the entry from the forwarding table.

8. A search engine to examine entries within a forwarding table, the search engine comprising:
    means for acquiring a first comparison criterion, the first comparison criterion including a mask indicating which bits of the entries are to be considered, a comparand value to be compared to the bits to be considered, and a comparison type to be used in comparing the entries with the first comparison criterion;
    means for acquiring at least one action associated with the first comparison criterion to be taken upon a positive comparison result;
    means for acquiring a second comparison criterion, the second comparison criterion including a mask indicating which bits of the entries are to be considered, a comparand value to be compared to the bits to be considered, and a comparison type to be used in comparing the entries with the second comparison criterion;
    means for acquiring at least one action associated with the second comparison criterion to be taken upon a positive comparison result;
    means for conducting a single comparison in accordance with the first comparison criterion and the second comparison criterion to at least one entry within the forwarding table;
    means for taking the at least one action associated with the first comparison criterion in response to a positive comparison result with respect to the first comparison criterion;
    means for taking the at least one action associated with the second comparison criterion in response to a positive comparison result with respect to the second comparison criterion; and means for reporting comparison matches for either or both of the first and second comparison criterion by writing the addresses of the matched entries to a memory.

9. The search engine as defined in claim 8, further comprising means for pausing the comparison while the memory is beyond a specified state of fullness until the memory is emptied below the specified state of fullness.

10. The search engine as defined in claim 8, further comprising means, before conducting each comparison, for checking whether the entry is valid and skipping the comparison with respect to that entry when the entry is not valid.

11. The search engine as defined in claim 8, wherein the at least one action associated with either or both of the first and second comparison criterion includes modifying the entry in the forwarding table.

12. The search engine as defined in claim 8, wherein the at least one action associated with either or both of the first and second comparison criterion includes marking the entry in the forwarding table.

13. The search engine as defined in claim 8, wherein the at least one action associated with either or both of the first and second comparison criterion includes setting at least one bit in a memory and the at least one bit corresponds to the entry in the forwarding table.

14. A search engine to examine entries within a forwarding table, the search engine comprising:
    means for acquiring a first comparison criterion, the first comparison criterion including a mask indicating which bits of the entries are to be considered, a comparand value to be compared to the bits to be considered, and a comparison type to be used in comparing the entries with the first comparison criterion;
    means for acquiring at least one action associated with the first comparison criterion to be taken upon a positive comparison result;
    means for acquiring a second comparison criterion, the second comparison criterion including a mask indicating which bits of the entries are to be considered, a comparand value to be compared to the bits to be considered, and a comparison type to be used in comparing the entries with the second comparison criterion;
    means for acquiring at least one action associated with the second comparison criterion to be taken upon a positive comparison result;
    means for conducting a single comparison in accordance with the first comparison criterion and the second comparison criterion to at least one entry within the forwarding table;
    means for taking the at least one action associated with the first comparison criterion in response to a positive comparison result with respect to the first comparison criterion; and
    means for taking the at least one action associated with the second comparison criterion in response to a positive comparison result with respect to the second comparison criterion, wherein the at least one action associated with either or both of the first and second comparison criterion includes deleting the entry from the forwarding table.

15. A computer-readable medium having stored thereon computer-executable instructions for performing a method for utilizing a search engine to examine entries within a forwarding table, the method comprising:
    acquiring a first comparison criterion, the first comparison criterion including a mask indicating which bits of the entries are to be considered, a comparand value to be compared to the bits to be considered, and a comparison type to be used in comparing the entries with the first comparison criterion;
    acquiring at least one action associated with the first comparison criterion to be taken upon a positive comparison result;
    acquiring a second comparison criterion, the second comparison criterion including a mask indicating which bits of the entries are to be considered, a comparand value to be compared to the bits to be considered, and a comparison type to be used in comparing the entries with the second comparison criterion;
    acquiring at least one action associated with the second comparison criterion to be taken upon a positive comparison result;
    conducting a single comparison in accordance with the first comparison criterion and the second comparison criterion to at least one entry within the forwarding table;
    taking the at least one action associated with the first comparison criterion in response to a positive comparison result with respect to the first comparison criterion;
    taking the at least one action associated with the second comparison criterion in response to a positive comparison result with respect to the second comparison criterion; and
    reporting comparison matches for either or both of the first and second comparison criterion by writing the addresses of the matched entries to a memory.

16. The computer-readable medium as defined in claim 15, wherein
    the method further comprises pausing the comparison while the memory is beyond a specified state of fullness until the memory is emptied below the specified state of fullness.

17. The computer-readable medium as defined in claim 15, wherein the method further comprises checking, before conducting each comparison, whether the entry is valid and skipping the comparison with respect to that entry when the entry is not valid.

18. The computer-readable medium as defined in claim 15, wherein the at least one action associated with either or both of the first and second comparison criterion includes deleting the entry from the forwarding table.

19. The computer-readable medium as defined in claim 15, wherein the at least one action associated with either or both of the first and second comparison criterion includes marking the entry in the forwarding table.

20. The computer-readable medium as defined in claim 15, wherein the at least one action associated with either or both of the first and second comparison criterion includes setting at least one bit in a memory and the at least one bit corresponds to the entry in the forwarding table.

21. A computer-readable medium having stored thereon computer-executable instructions for performing a method for utilizing a search engine to examine entries within a forwarding table, the method comprising:
    acquiring a first comparison criterion, the first comparison criterion including a mask indicating which bits of the entries are to be considered, a comparand value to be compared to the bits to be considered, and a comparison type to be used in comparing the entries with the first comparison criterion;
    acquiring at least one action associated with the first comparison criterion to be taken upon a positive comparison result;

acquiring a second comparison criterion, the second comparison criterion including a mask indicating which bits of the entries are to be considered, a comparand value to be compared to the bits to be considered, and a comparison type to be used in comparing the entries with the second comparison criterion;

acquiring at least one action associated with the second comparison criterion to be taken upon a positive comparison result;

conducting a single comparison in accordance with the first comparison criterion and the second comparison criterion to at least one entry within the forwarding table;

taking the at least one action associated with the first comparison criterion in response to a positive comparison result with respect to the first comparison criterion; and taking the at least one action associated with the second comparison criterion in response to a positive comparison result with respect to the second comparison criterion, wherein the at least one action associated with either or both of the first and second comparison criterion includes modifying the entry in the forwarding table.

\* \* \* \* \*

UNITED STATES PATENT AND TRADEMARK OFFICE
CERTIFICATE OF CORRECTION

PATENT NO. : 7,274,693 B1 Page 1 of 1
APPLICATION NO. : 10/329249
DATED : September 25, 2007
INVENTOR(S) : Raymond J. Kloth et al.

It is certified that error appears in the above-identified patent and that said Letters Patent is hereby corrected as shown below:

Title Page, Item (63), should read: --      Related U.S. Application Data (63) Continuation of Application No. 09/287,301, filed on April 7, 1999, now U.S. Patent No. 6,570,877 --.

Signed and Sealed this

First Day of June, 2010

David J. Kappos
*Director of the United States Patent and Trademark Office*